Mar. 27, 1923.

G. HILL 1,450,038

COMBINED WAVE CHANGER AND WAVE METER

Filed Apr. 28, 1920      3 sheets-sheet 1

Inventor
Guy Hill

By
Attorneys

Mar. 27, 1923.

G. HILL

COMBINED WAVE CHANGER AND WAVE METER

Filed Apr. 28, 1920       3 sheets-sheet 2

1,450,038

Inventor
Guy Hill

Patented Mar. 27, 1923.

1,450,038

UNITED STATES PATENT OFFICE.

GUY HILL, OF WASHINGTON, DISTRICT OF COLUMBIA.

COMBINED WAVE CHANGER AND WAVE METER.

Application filed April 28, 1920. Serial No. 377,383.

*To all whom it may concern:*

Be it known that I, GUY HILL, a citizen of the United States, and a resident of Washington, District of Columbia, have invented certain new and useful Improvements in a Combined Wave Changer and Wave Meter, of which the following is a specification accompanied by drawings.

This invention relates to radio signaling apparatus, but more particularly to a wave changer device. The primary object of the invention is to provide operative means in connection with a wave changer for accurately determining the wave length using a wavemeter having several scales which are attached to the movable plates of a variable condenser.

The invention involves a method of having the indicating pointer of the wavemeter which indicates the wavelength on the various scales so combined with the wave changer, that as the handle of the wave changer is operated, the pointer for the wavemeter is operated and picks out or selects the proper scale.

In radio transmitting sets, such as arc sets, where coupled circuits are not employed, impact sets, and certain forms of audion sets where the radiated wave length depends upon the constants of the antenna circuit and not upon the constants of the primary circuit, the operator has no method of knowing the wave length transmitted after the set is once tuned and adjusted, in case the constants of the antenna are changed; that is, if the set was adjusted to a fixed antenna and this antenna became destroyed, and a new antenna of different constants had to be used, the operator could in no way determine the wavelength being transmitted, unless he was provided with a wavemeter.

If such a set includes a wavemeter, which is a separate piece of apparatus, such an instrument might easily be removed from the set, and if the transmitting set were on shipboard the wavemeter could easily be left ashore, or in some inaccessible place, so that in case of emergency the operator might have no method of knowing the wavelength he was using.

The present invention overcomes the above difficulties by having a wavemeter built into the transmitting set as a definite part of the transmitting equipment, and in addition so mechanically coupled to the transmitter that when the wavelength is changed the indicating pointer of the wavemeter is also adjusted to prevent the operator setting his wave-changing switch on one wave length and his wavemeter indicating pointer on the wrong scale, and thereby cause confusion.

Figure 1:
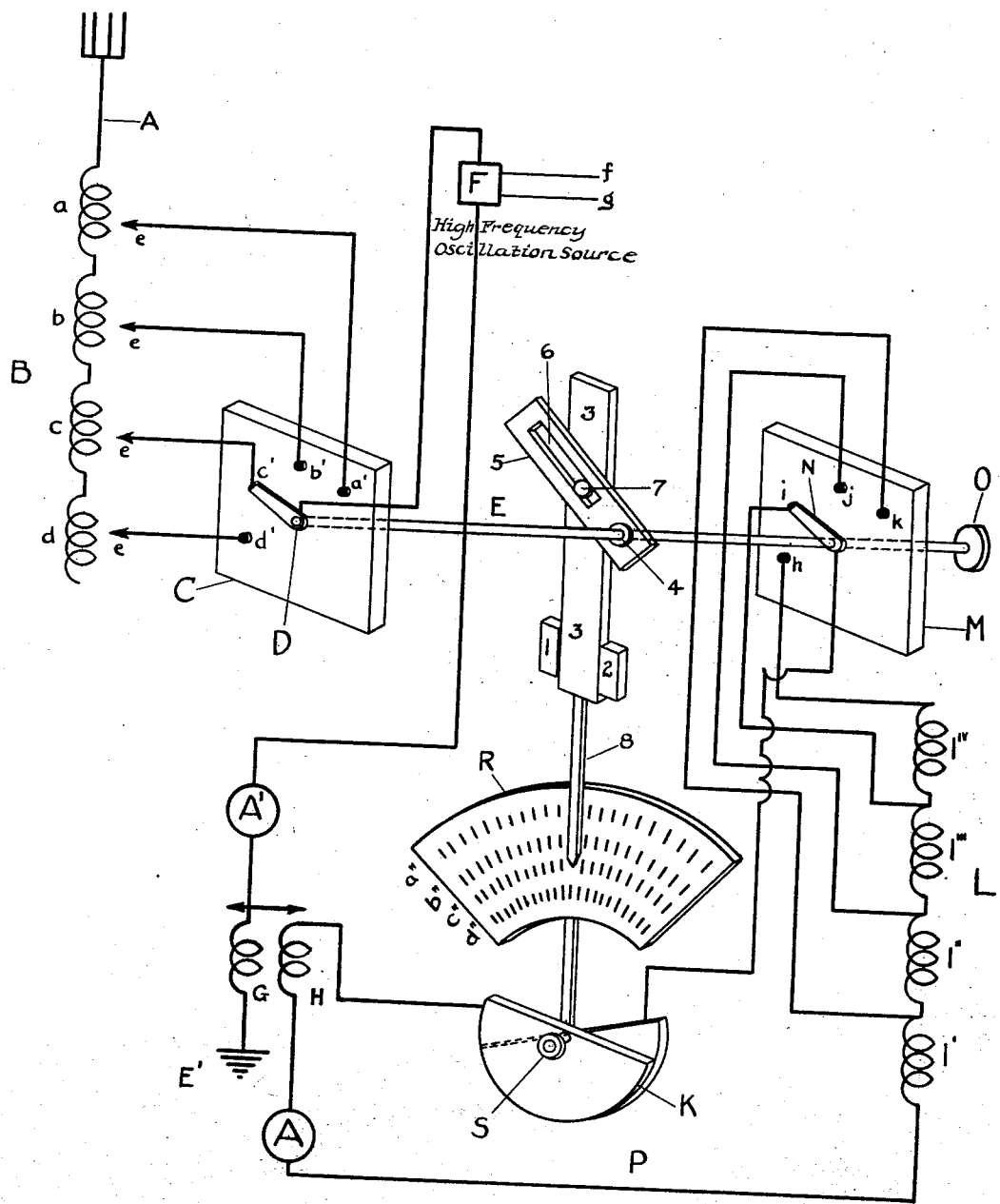
Fig. 1 is a diagrammatic representation of circuits and apparatus for carrying out the invention.
Figure 4:
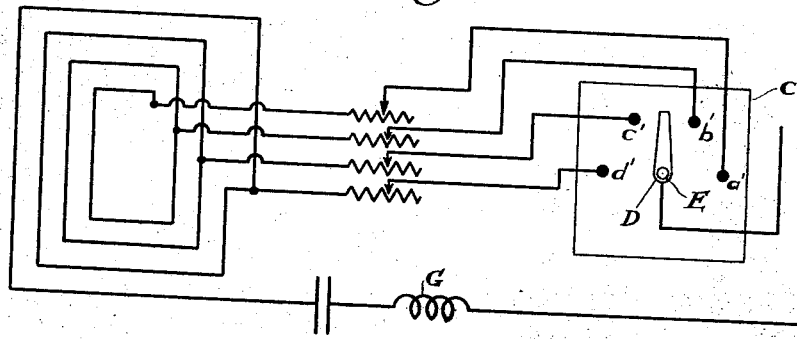
Figure 5:
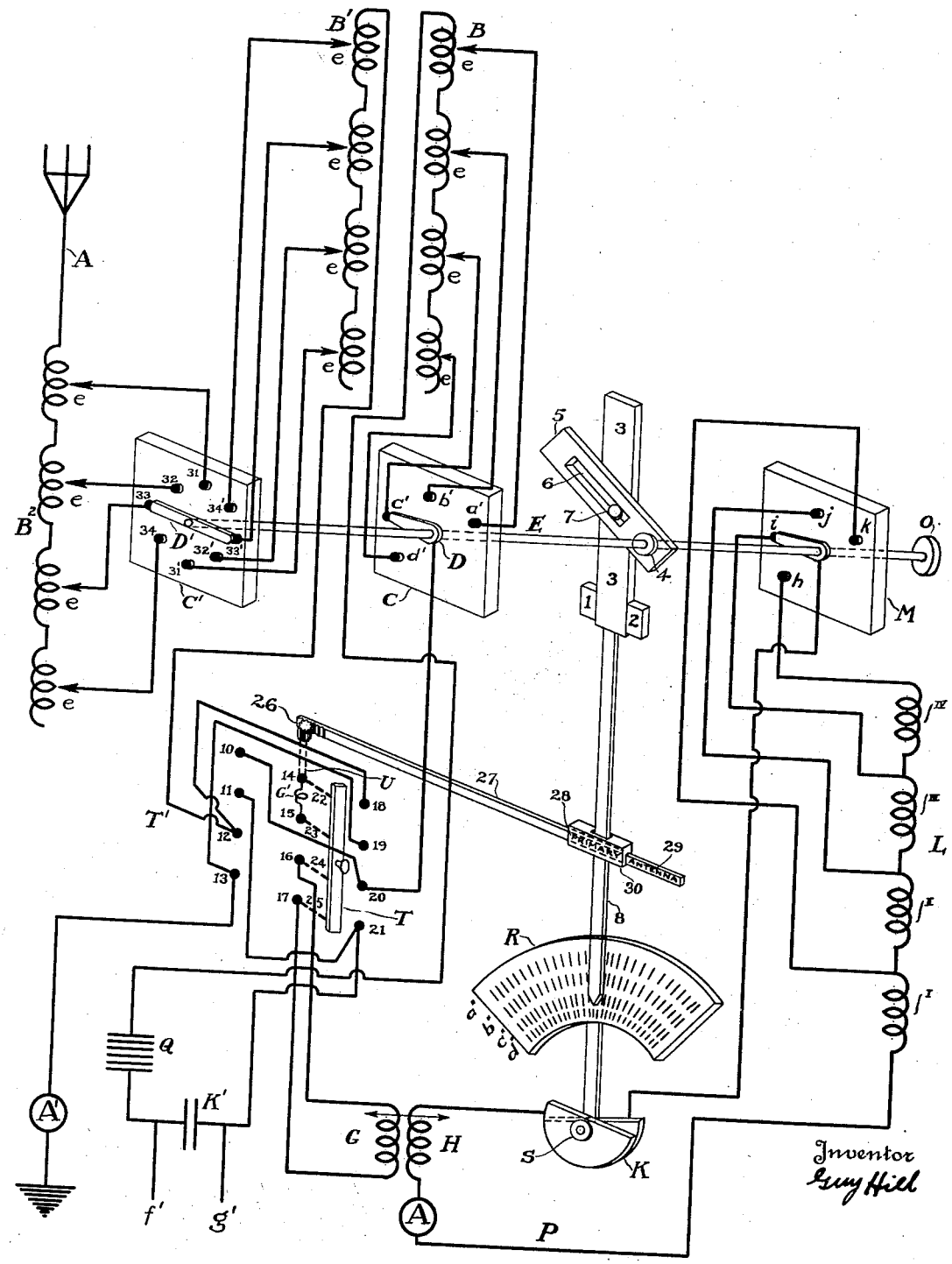

Figure 4 illustrates connections which can be used for that part of the transmitting set corresponding to the antenna and loading inductances shown in Figure 1 in case a loop antenna is used for transmitting radio energy; and, Figure 5 illustrates connections for combining the transmitter and wave meter similar to those shown in Figure 1 except that provision is made for measuring the wave-length in either the closed circuit or the antenna circuit with automatic means for indicating which circuit is being measured.

Referring to Fig. 1, A represents the antenna, connected in circuit with which is a loading coil system B having sections $a$, $b$, $c$, $d$, each provided with adjustable slider clips $e$ connected to contact studs $a'$, $b'$, $c'$ and $d'$ on transmitter switch panel C.

A wave changing switch arm D connected to shaft E is adapted to sweep over and make successive contact with studs $a'$, $b'$, $c'$ and $d'$ for varying the loading inductance.

Arm D is connected to ground at E' through a suitable source of supply F of high frequency oscillations which may be an arc generator, and for the purpose of this invention, the source of supply F is merely indicated conventionally, it being understood that any other desired apparatus instead of an arc may be used. The invention may be applied to a quenched spark set, for instance, and the leads $f$ and $g$ shown in connection with the conventional device indicated by the letter F may lead to the secondary of an oscillation transformer, to a primary circuit or to a source of supply of high frequency oscillations.

The wavemeter P, together with its controlling devices and connections, is preferably adapted to be built into the transmitting set and forms a part thereof and of the wave changer, so that the wave changer and wavemeter can be interlocked and form one unit. A loop G of one or more turns is inserted in the antenna circuit and the wavemeter circuit includes a similar loop H inductively coupled to loop G. Coil G or H can be movable if desired, to vary the amount of energy received by the wavemeter.

Figure 2:
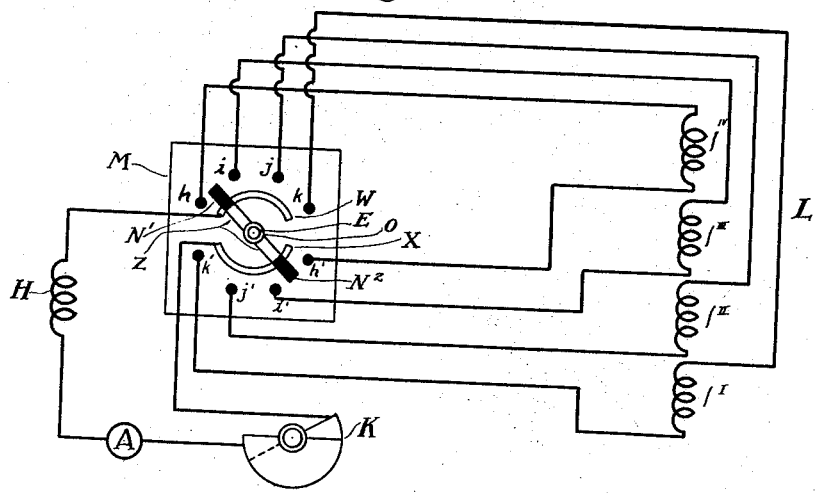
Figure 2 represents a modification of the wavemeter circuit wherein separate inductances are used to correspond respectively to each position of the wave changer switch instead of using one inductance for various taps as shown in Figure 1.

The wavemeter consists of the following: M is a panel having a switch arm N which makes contact with one of the contacts $h$, $i$, $j$, $k$. The contacts $h$, $i$, $j$, $k$ are connected to various coils of the wavemeter respectively, $l^{iv}$, $l^{iii}$, $l^{ii}$, $l^{i}$. These coils are in series and represented as the wavemeter inductance L. If desired, however, two arms can be used for the wavemeter inductance as shown in Fig. 2, so that only one coil is in circuit at a time.

The switch arm N is connected by the insulating shaft E to the switch arm D.

K represents a variable condenser. To the rotating shaft of this condenser is attached a handle S and a movable scale R. This scale R has a scale for each value of inductance L in the wavemeter, suitable for reading wavelength for each contact point of the wave changer switch C. These scales are indicated by $a''$, $b''$, $c''$, $d''$. 8 represents a pointer for reading the wavelength from whichever scale on R the pointer indicates.

The pointer 8 is attached to a slider 3 which moves between guides 1 and 2. The slider 3 has a stud 7 which fits a slot 6 in arm 5 attached to the shaft of the wave changer E.

The operation is as follows: By hand O the shaft E is turned until arm D on panel C rests on contact C which is the wavelength desired. This operation of shaft E at the same time connects arm N on panel M to contact $i$. When arm N is on contact $i$, the proper amount of inductance in L is connected into circuit in the wavemeter P for obtaining resonance when the variable condenser is rotated by handle S. Resonance being indicated by maximum reading of ammeter A. At the same time the rotation of the shaft E moves arm 5 and by action of slot 6 with stud 7 the slider 3 is moved so that the pointer 8 selects the proper scale on R for directly reading the wavelength, in this case being scale $c$.

In order to obtain accurate reading of wavelength, especially if the wavelengths of the transmitting set cover considerable range, several different inductances must be used in the wavemeter and of course with each inductance a different wavelength scale is necessary. By this invention the proper one of the scales is automatically selected.

After the set is once installed and the wavemeter P calibrated the operator has but one handle O for manipulation in making adjustments for change of wavelength. The provision of common operative means between switches D and N and pointer 8 prevents the operator through carelessness or in time of excitement, from setting his wave changing switch arm D on contact $b'$ for instance, and his wavemeter pointer 8 on the wrong scale and then attempting to tune the set by means of the wavemeter P, in which case he would believe he was sending on one wavelength but might actually tune the set for a different wavelength. That is, if arm 8 did not point automatically to the proper scale, the operator might be reading his wave length from the wrong scale.

Referring to Fig. 2, as stated above, the inductance L and switch panel M can be so designed that only one wavemeter inductance is used for each scale on R. A method for doing this is shown in Fig. 2. A, E, H, K, M and O represent same functions as in Fig. 1.

The arm N of Fig. 1 is replaced in Fig. 2 by an arm N' Z N², where N' makes contact between arc W and contacts $h$, $i$, $j$, $k$ and N² makes contact between arc X and contacts $h'$, $i'$, $j'$ and $k'$, Z being insulating material to separate electrically N' and N².

If the switch arm N' Z N² is on contacts $h$ and $h'$ then wavemeter inductance $l^{iv}$ only is in circuit in the wavemeter.

Fig. 1 indicates the ordinary form of elevated antenna with lower end of antenna circuit grounded. Since this invention relates to a method of combining a wavemeter with one or more movable scales with a transmitting set the form of antenna used is immaterial. In place of the antenna of Fig. 1 there could be substituted telegraph or telephone wires, a low horizontal antenna or underground or underwater antenna. Likewise a loop could be used of one or more turns which would be formed by connecting a condenser between A and E of Fig. 1. It is considered unnecessary to show all these various types of antenna.

Figure 3:
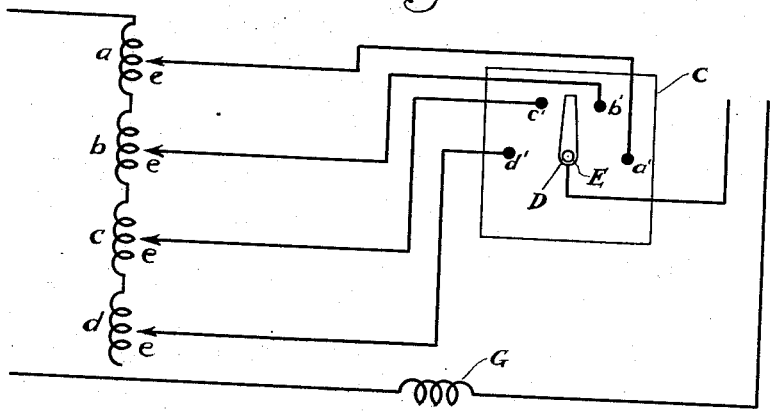
Figure 3 illustrates connections to be employed in the event that radio energy is to be sent over wires instead of being radiated from an antenna.

Fig. 3 indicates the connections if telegraph wires are used.

Fig. 4 indicates one method of using a loop antenna of one or more turns.

Fig. 5 is a similar to Fig. 1 except it provides for means of measuring the wavelength of two circuits in such a manner that the operator has definite and positive indication of which circuit his wavemeter is recording. The diagram relates in detail to a quenched gap circuit but the method shown is applicable for use of a single wavemeter to measure wavelength in any two circuits whether they are associated or not. By making the switch represented by handle T of different form such as a rotary switch the indicator arm 27 could have three or more indicators 28, 29, so that the movement of switch handle T could connect coil G in any one of three or more circuits and the indicating arm 27 have three or more indicators to designate the circuit associated with the wavemeter.

Referring to the various elements of Fig. 5, only those elements not shown in Fig. 1 will be referred to and the same symbols are used for corresponding elements in Figs. 1 and 5.

B² represents loading coils in antenna A. B' represents coupling coil in inductive relation with closed circuit or primary coil B. With the wave changer switch in the position as shown in the figure, the antenna circuit consists of the first two coils in B² and a portion of the third coil then lead to contact 33 on panel C', then arm D', then contact 33', then a portion of a coil and two complete coils in B' and then lead to contact 12 on switch T' and then to ground E' either through coil G or G'.

The primary circuit consists of condenser K' quenched gap Q a lead going to the top of inductance B, then two and a portion of a third coil in B, then to switch contact c' on panel C, then through arm D and a lead to contact 20 on switch T' and then through either coil G' or G to contact 21 and back to the other side of condenser K' completing primary circuit.

The switch T' as will be readily seen from the connections will put coil G in the primary circuit when thrown to the left and coil G' in the antenna circuit. The coils G and G' with their connecting leads to switch T' are of equal inductance. When the switch T' is thrown to the right the circuits in which coil G and G' are inserted are reversed, that is, coil G is in the antenna circuit and coil G' in the primary circuit.

Attached to the switch handle T is a shaft U having a pinion which engages with a rack on 27, the rack and pinion being indicated by 26. The action of the rack and pinion is such that the indicating arm 27 is moved back and forth by action of switch handle T. On 27 are indicators 28 and 27, one of which is visible through slot or window in 30.

The indicator appearing in 30 designates in which circuit coil G is inserted so that the operator can tell at a glance of which circuit he is reading the wavelength.

A "dummy antenna" can be included in the transmitter and by the same method the switch T can put coil G in dummy antenna when desired and have an indicator marked "dummy antenna" appear at slot in 30. It is considered unnecessary to add additional figures to show this feature as the principle of connections and operation of arm 27 will be the same as above. The dummy antenna could of course be added to Fig. 1 or Fig. 5. The modifications of Figs. 2, 3 and 4 are of course applicable to Fig. 5.

All of the above figures and methods described would be of value with the circuits shown in my United States Patent No. 1345007 and can be readily incorporated with the apparatus and circuits described in that application.

$f'$ and $g'$ refer to leads to a high tension transformer for charging condenser K'.

E represents an insulated shaft connecting handle O, arm N, arm 5, arm D and arm D'.

As shown in Figures 1, 2 and 5, a different value of inductance L in the wavemeter is shown for each contact point of the wave changer switch. This will be of value or necessary if accurate reading of wavelength is to be obtained and the wavelengths corresponding to different contact points are widely spaced. If any two or more of the wavelengths are close together then it may be possible to obtain two or more wavelengths on the same inductance in the wavemeter. This can be obtained by connecting together adjacent contacts such as $h$ and $i$ on panel M, Fig. 1, and omitting coil $l^{iv}$. In such a case scales $c''$ and $d''$ on R would be identical or combined in one scale. This is such a self evident and simple modification it is considered unnecessary to illustrate it by a special figure.

In case the variation or change in wavelength in the transmitting apparatus is continuous instead of being made in definite steps as indicated in the above figures the same method as illustrated in the above specification will apply. That is, in Fig. 1, the handle O may operate a variometer in the antenna circuit instead of the step by step variation or shaft E may operate a variable condenser in the antenna circuit and thereby change wavelength. In this case the slot 6 in figure in arm 5 would have an irregular shape so that arm 3 and pointer 8 would remain stationary while shaft E moved through a predetermined arc and then suddenly move to another scale when the limits of this arc were exceeded. Since many such modifications would naturally follow from the disclosure made herein it is considered additional drawings would not be necessary for one skilled in the art to carry out any similar modifications.

Many other modifications employing the above principles can be made. For instance, two variable condensers can be operated by handle S, that is, two condensers on the same shaft. By a modification of switch panel M, the desired condenser can be automatically connected in circuit. If two condensers were used of course the number of different inductance values could be decreased.

Another modification would be to use a variometer or variable inductance attached to handle S and a number of fixed condensers connected properly in circuit. They could be connected in series the same as coils $l^i$, $l^{ii}$ etc. of Fig. 1 or one at a time connected in circuit, the same as $l^i$, $l^{ii}$ of Fig. 2, or by various other schemes.

The circuit and apparatus shown in this application represent a modification of my United States Patent No. 1338984. The modifications show many improvements however that probably would not be evident even by one skilled in the art, and therefore the improvements are fully described and set forth in this application. In addition to what might be classed as improvements, several entirely new features are included.

I claim and desire to obtain by Letters Patent:

1. In a radio transmitting set, in combination, an antenna and a variable loading inductance, a primary oscillatory circuit associated therewith, a wavemeter including a variable capacity and a variable inductance, a switch for coupling said wavemeter to either the antenna circuit or said primary circuit, means for simultaneously and conjointly varying said loading inductance, said wavemeter inductance, and the inductance of said primary circuit in a plurality of steps, means associated with and movable by said variable capacity of said wavemeter and bearing a plurality of graduated scales corresponding in number to said plurality of steps in said variable inductances, an indicating device associated with said plurality of scales, and means operated by said inductance varying means for positioning said indicating device in operative relation to one of said graduated scales, and operated by said switch for visually indicating to which of said transmitting circuits said wavemeter is coupled.

2. In a radio transmitting set, in combination, an antenna and a variable loading inductance, a primary oscillatory circuit associated therewith, a wavemeter including a variable capacity and a variable inductance, an indicating device associated with a plurality of scales and operable by said wavemeter inductance varying means, and means for visually indicating whether said wavemeter is coupled to said primary oscillatory or said antenna circuit.

3. In a radio transmitting set, in combination, an antenna and a variable loading inductance, a wavemeter associated therewith and including a variable inductance, said wavemeter also having a variable capacity by means of a variable condenser, a wave changing switch for varying said loading inductance in a plurality of steps, a wavemeter switch for varying said wavemeter inductance in a like plurality of steps, means bearing a like plurality of graduated scales associated with said variable capacity and movable directly by the manual operation of said variable condenser to which said scales are connected for varying said capacity, an adjustable indicating device associated with said plurality of scales, and common means for simultaneously actuating both of said switches and positioning said adjustable indicating device in operative relation to one of said plurality of scales.

4. In a radio transmitting set, in combination, an antenna and a variable loading inductance, a primary oscillatory circuit associated therewith, a wavemeter including a variable inductance and also a variable capacity by means of a variable condenser, a wave changing switch for varying said loading inductance, a switch for varying the inductance of said primary oscillatory circuit, a wavemeter switch for varying said wavemeter inductance in a like plurality of steps, means bearing a like plurality of graduated scales associated with said variable capacity and movable directly by the manual operation of said variable condenser to which said scales are connected for varying said capacity, an adjustable indicating device associated with said plurality of scales, and common means for simultaneously actuating said three switches and positioning said adjustable indicating device, in operative relation to one of said plurality of scales.

In testimony whereof, I have signed my name to this specification.

GUY HILL.